United States Patent [19]
Meylor et al.

[11] Patent Number: 5,540,844
[45] Date of Patent: Jul. 30, 1996

[54] DEWATERING SYSTEM

[76] Inventors: Donald M. Meylor, 22316 Harkwood, El Toro, Calif. 92630; Patrick J. Finn, 845 Paularine Ave., Apt. E320, Costa Mesa, Calif. 92626

[21] Appl. No.: 505,449

[22] Filed: Jul. 21, 1995

[51] Int. Cl.⁶ .................. C02F 1/24; C02F 9/00; B01D 36/00
[52] U.S. Cl. .......... 210/703; 210/712; 210/776; 210/805; 210/196; 210/202; 210/221.2; 210/295
[58] Field of Search .................... 210/703, 712, 210/776, 805, 196, 202, 221.2, 221.1, 295

[56] References Cited

U.S. PATENT DOCUMENTS

| | | |
|---|---|---|
| 1,286,554 | 12/1918 | Dekker. |
| 1,743,179 | 1/1930 | Zeb. |
| 1,963,861 | 6/1934 | Noll. |
| 2,491,912 | 12/1949 | Walker. |
| 2,755,293 | 12/1951 | McDonald. |
| 3,121,680 | 2/1964 | Ciabattari. |
| 3,252,896 | 5/1966 | Albertson. |
| 4,380,496 | 4/1983 | Maffet. |
| 4,830,188 | 5/1989 | Hannigan. |
| 4,859,322 | 8/1989 | Huber. |
| 4,997,578 | 3/1991 | Berggren. |
| 5,009,795 | 4/1991 | Eichler. |
| 5,091,083 | 2/1992 | Meylor. |
| 5,229,010 | 7/1993 | Fluchel. |
| 5,242,600 | 9/1993 | Meylor. |
| 5,305,888 | 4/1994 | Meylor. |

*Primary Examiner*—Thomas M. Lithgow
*Attorney, Agent, or Firm*—Freilich Hornbaker Rosen

[57] ABSTRACT

Apparatus and method is described for dewatering sludge obtained from a flotation tank, which efficiently handles the sludge and avoids the need for adding polymers to reflock the sludge. The sludge dewatering portion includes a conveyor (40, FIG. 1) which has an uppath portion (42) that receives sludge that is dropped over a cliff (32), the conveyor having a downpath portion (44) which firmly compresses the sludge as it continues to move along the conveyor. The conveyor preferably extends at an incline to the horizontal with the downpath portion lying higher than the uppath portion, and with a fluid conduit lying under the conveyor and carrying liquid downwardly along the incline to a pump (74) that pumps the liquid along a return conduit (80) back to the flotation tank. One conveyor includes an elongated shaft (50, FIG. 2) with a screw (54) or spiral conveyor fixed to the shaft, with a large diameter uppath screw portion (55) that receives the dropped sludge and a smaller diameter downpath screw portion (62), and with the uppath screw portion being of smaller diameter and being substantially completely enclosed to compress the sludge thereat.

4 Claims, 3 Drawing Sheets

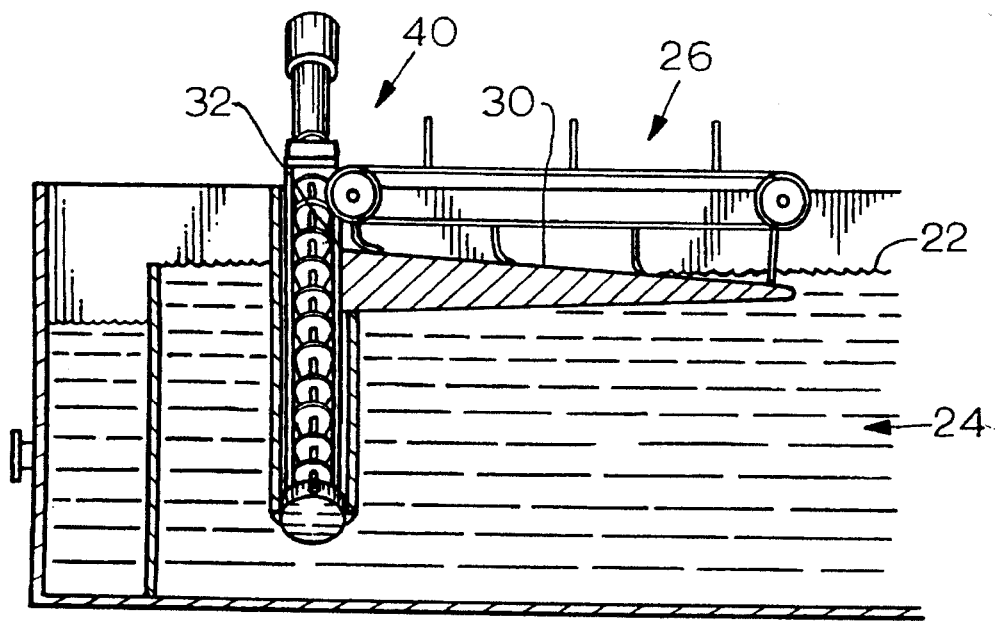
FIG. 3
FIG. 4
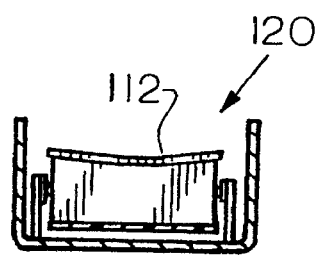
FIG. 8
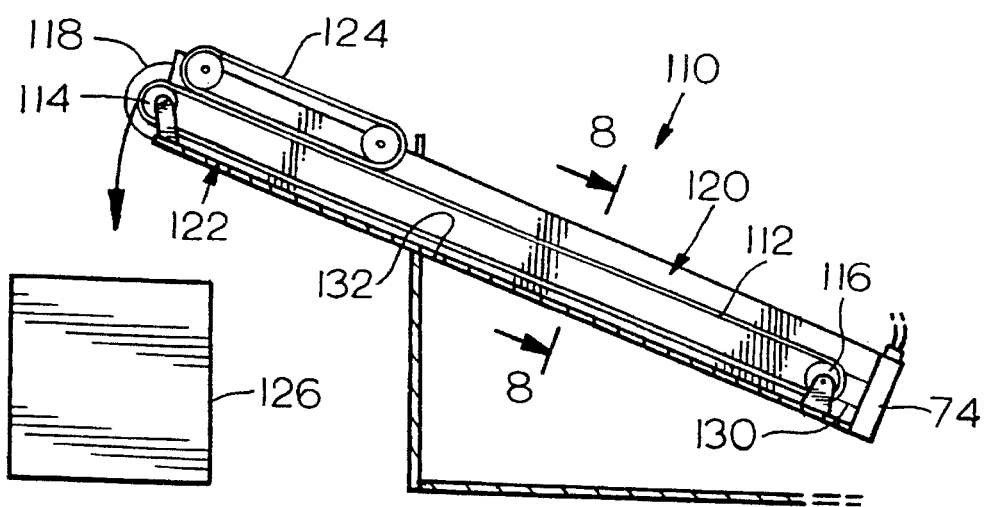
FIG. 7

5,540,844

DEWATERING SYSTEM

BACKGROUND OF THE INVENTION

A mixture containing primarily liquid and fine particles therein, such as waste water, can be initially treated by flowing the mixture into a tank along with myriad microscopic air bubbles that float a large portion of the particles at the surface of the liquid. The fine particles are skimmed from the surface and tend to stick together to form sludge, with the sludge dropped into a conveyor that moves it. Our earlier U.S. Pat. No. 5,091,083 shows a system of this type. Once the sludge has been moved out of the boundaries of the tank by the conveyor, it is usually pumped to a dewatering facility that compresses the sludge to remove almost all liquid therein. This allows the sludge to be efficiently disposed of, as by drying in the sun and used to form construction material or otherwise disposed of. Efficient pumps for pumping the sludge from the conveyor to the final dewater apparatus include rotating vanes that cut the sludge while pumping it. Before the pumped sludge is finally dewatered, a polymer is added to the sludge to recoalesce it. Although only one to one hundred parts per million of polymer is added to the sludge, the polymer is expensive (e.g. $3.00 per pound). A system for dewatering sludge which was of low cost, occupied minimal space, and avoided the need to pump the sludge, would be of value.

SUMMARY OF THE INVENTION

In accordance with one embodiment of the present invention, apparatus is described for use with a system that skims and drops floating particles, or sludge, and which carries away the sludge and dewaters it in an efficient manner. The apparatus includes a conveyor having an uppath portion that lies under the drop location of the particles to receive them, the conveyor having a downpath portion which compresses the particles to remove liquid. The conveyor includes a liquid receiver which receives and carries away liquid from the downpath portion of the conveyor where the sludge is compressed. The conveyor preferably extends at an incline to the horizontal with the downpath portion lying higher than the uppath portion, and with a fluid conduit lying under the conveyor which carries the fluid downward along the incline and removes it. The removed fluid is preferably pumped into an upstream end of a flotation tank to mix with the original mixture of liquid and particles.

One conveyor includes an elongated shaft and a large diameter uppath screw portion fixed to the shaft and lying under a location where particles skimmed from a liquid bath are dumped. The conveyor also includes a downpath screw portion that is also fixed to the shaft but that has a smaller diameter than the uppath portion. A housing surrounds most of the large diameter screw portion but has an open top to receive sludge, while the smaller diameter downpath screw portion is substantially completely surrounded to enable the sludge to be compressed thereat.

The novel features of the invention are set forth with particularity in the appended claims. The invention will be best understood from the following description when read in conjunction with the accompanying drawings.

BRIEF DESCRIPTION OF THE DRAWINGS

FIG. 3 is a sectional view of the apparatus of FIG. 2.

FIG. 4 is a sectional view of the pump of FIG. 3.

FIG. 7 is a partial sectional view of a conveyor constructed in accordance with another embodiment of the invention.

FIG. 8 is a view taken on line 8—8 of FIG. 7.

DESCRIPTION OF THE PREFERRED EMBODIMENTS

Figure 1:
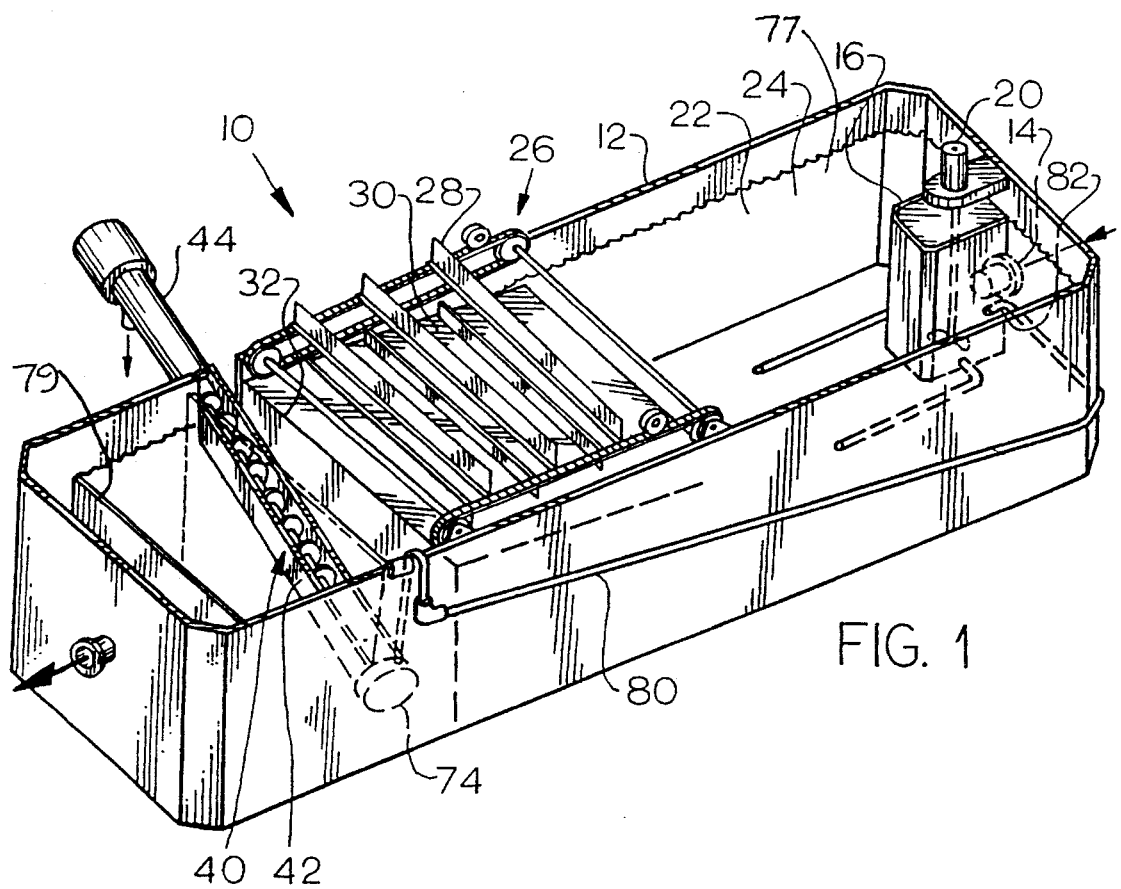
FIG. 1 is an isometric view of apparatus for separating liquid from particles.

FIG. 1 illustrates an apparatus 10 for separating liquid from particles. A mixture of liquid and particles such as waste water, is pumped into a flotation tank 12 through an inlet 14 that opens to an enclosure 16. A bubble generating device 20 produces a large number of microscopic bubbles of air at a lower portion of the enclosure, to move up with the mixture through the enclosure and into the rest of the tank. The bubbles cling to particles and float them at the surface 22 of a bath 24. A skimming apparatus 26 has rubber blades 28 that skim, or wipe particles floating at the surface along a beach 30 and over a cliff 32. Other skimming devices are available that similarly drop particles at a drop location such as at or just beyond the cliff 32. A conveyor 40 lies under the drop location 32 formed by the cliff to receive the particles. The particles which float at the surface and are wiped along the beach, tend to cling together to form sludge, so that sludge with a high liquid content is dropped into the conveyor 40 clean water exits at a weir 79.

Figure 2:
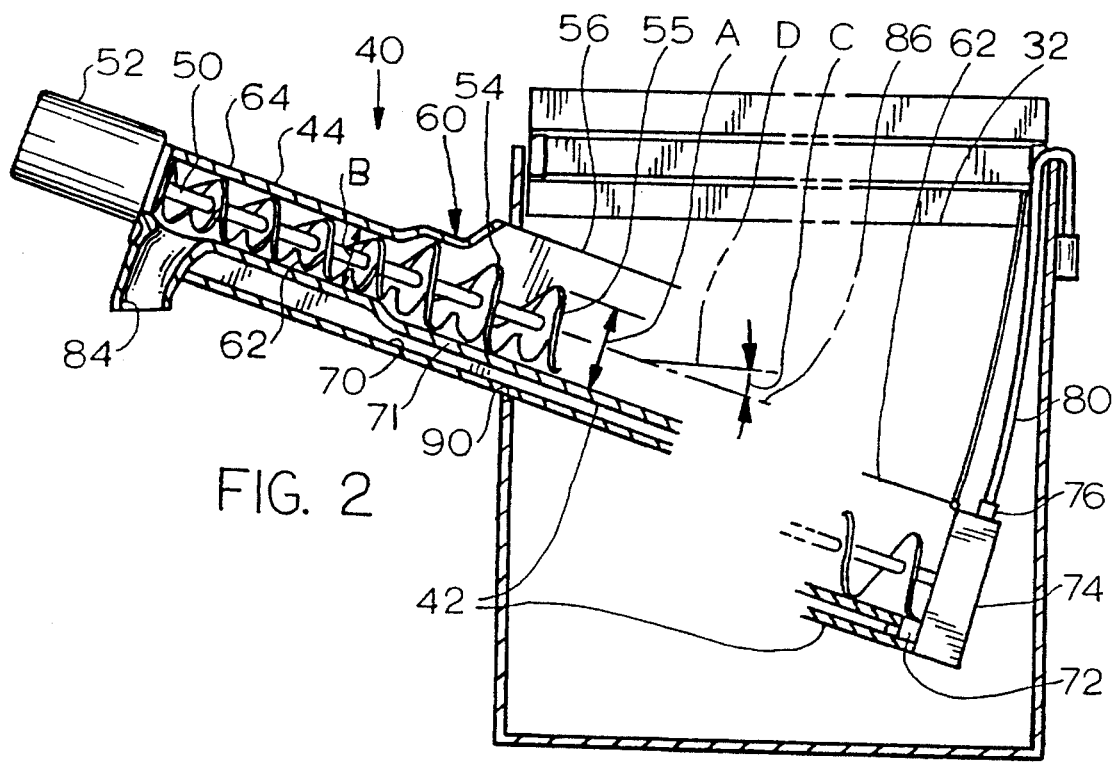
FIG. 2 is a sectional view of the apparatus of FIG. 1.

The conveyor 40 has an uppath portion 42 that lies under the drop location 32 to receive the clumped particles, or sludge. The conveyor also has a downpath portion 44 which compresses the sludge moving along the conveyor to remove liquid therefrom. As shown in FIG. 2, the conveyor includes a liquid receiver 70 which receives and carries away liquid from sludge that moves along the uppath portion 42 as well as liquid that results from compression of the sludge along the downpath portion 44 of the conveyor.

The conveyor 40 shown in FIG. 2, includes an elongated shaft 50 that is rotated by a geared motor 52. The conveyor also includes a screw portion, or spiral conveyor, 54 with an uppath portion 55 that has an average diameter A. The uppath screw portion lies within a portion 56 of a conveyor housing 60 which has an open top or upper side 63, that catches dropped particles and with a closed bottom or bottom side (as shown at 70 in FIG. 5). The open top is positioned to receive sludge dropped at the drop location of the cliff 32. The conveyor also includes a downpath screw portion 62 which is of a smaller average diameter B and which is also fixed to the shaft 50. The housing includes an uppath housing part 64 which substantially completely (substantially 360°) surrounds the uppath screw portion 62 to limit the escape of sludge. The uppath housing part 56 can have an open top because sludge is not tightly compressed therealong, although its slight agitation by the uppath screw portion causes some dewatering. However, the downpath housing part 64 encloses the screw to avoid escape of compressed sludge.

The housing 70 of the conveyor 40 includes a liquid receiver 70 that lies under a housing portion 71 that closely surrounds the lower portion of the screw, and that carries former sludge-containing liquid in an uppath direction, opposite to the direction of movement of sludge by the screw, to a fluid outlet 72. A pump 74 receives fluid at 72 and pumps it through a pump exit 76. A return conduit 80 carries the fluid to an upstream end 77 of the tank 12. The return conduit preferably has an exit end 82 (FIG. 1) opening to the enclosure 16 so any particles passing with liquid along the return conduit, tends to encounter air bubbles to float them. As shown in FIG. 2, sludge compressed by the uppath screw portion 62 passes through an exit 84, from which it can be moved to a sun drying area for final drying before disposal.

Figure 6:
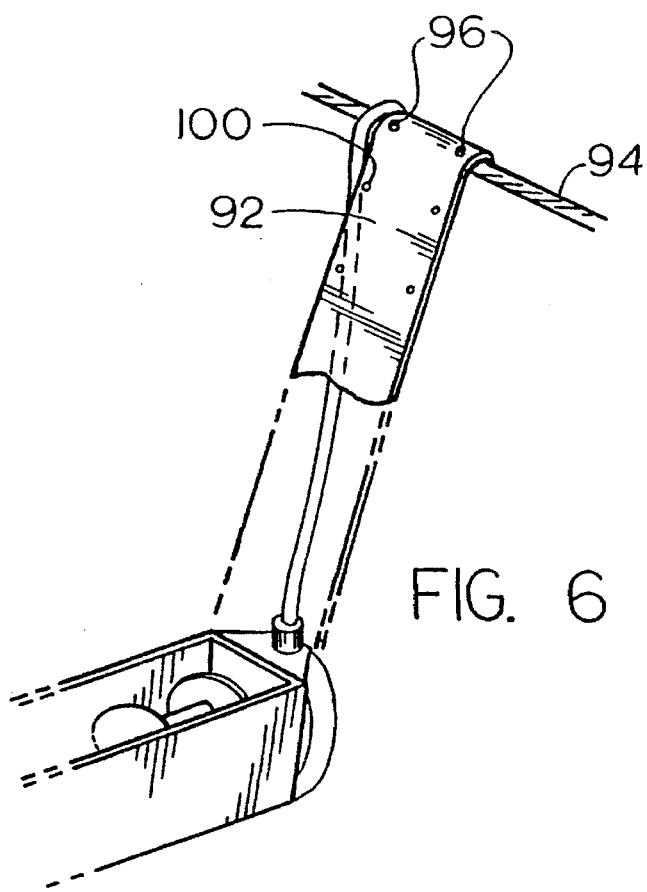
FIG. 6 is a partial isometric view of the conveyor of FIG. 2.

The axis 86 of shaft 50 and the screw portions 55, 62 thereon extend at an angle C to a horizontal line D, so that the downpath portion 62 of the screw conveyor lies higher than the uppath portion 42. An angle C of a plurality of degrees, with an angle of about 15° to 20° being shown, helps to dewater the sludge by the fact that the sludge constantly presses against a screw surface and because liquid removed from the sludge is immediately drained away. However, the greater the angle, the less efficient is the screw conveyor in housing the sludge. The best angle depends on the particular application, that is, the amount and type of sludge. The conveyor 40 is pivotally mounted at 90 on a tank wall. As shown in FIG. 6, a flexible web member 92 such as a flexible plastic sheet, extends largely upwardly from the uppath end of the conveyor to a tank wall 94. The effective length of the member 92 can be changed, as by moving it so that posts 96 on the tank wall extend through different pairs of holes 100 in the member, to adjust the angle of incline of the conveyor, and specifically of the shaft and the screw with different diameter portions thereof. The member 92 helps to direct falling sludge into the conveyor.

Figure 5:
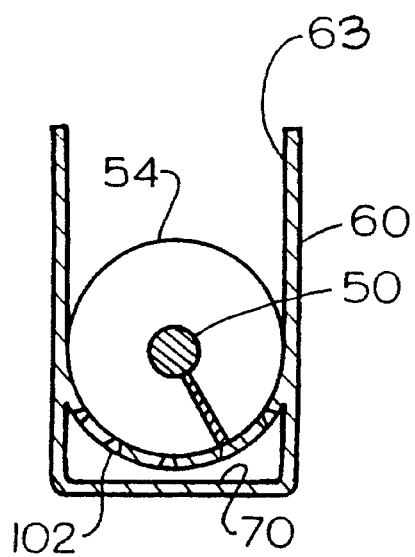
FIG. 5 is a sectional view of a portion of the conveyor of FIG. 3.

FIG. 5 is a sectional view of the conveyor, showing the screw portion 54, and showing holes 102 for draining liquid to the liquid receiver 70 and for allowing the escape of sludge that otherwise might become trapped and impede turning of the screw. FIG. 4 shows one example of a pump 74 with a vane pump inlet at the fluid outlet 72 of the conveyor.

FIGS. 7 and 8 illustrate another conveyor 110 which includes a main endless belt 112 that extends between a pair of rollers 114, 116, with roller 114 turned by a motor 118. An upstream portion 120 of the conveyor is constructed to receive sludge dumped thereon. A downstream portion 122 of the conveyor includes a second belt 124 with one side of the belt 124 lying facewise against the first belt 112, to compress sludge between them. Spring-loaded backup rollers can be used to press the belts towards each other to aid in dewatering the sludge. Dewatered sludge is dumped into a container 126 from which it can be further dried. The roller 116 is coupled through a gear transmission 130 to pump 74 which pumps water back to an upstream portion of a tank. Water from the sludge flows along a bottom wall 132 to the pump 74.

Thus, the invention provides a conveyor for carrying away and dewatering sludge, the conveyor usually being part of an apparatus for separating liquid from particles by floating the particles and then dropping them into the conveyor. The conveyor has an upstream portion where the conveyor housing has an open top to receive the particles, and has a downstream conveyor portion which compresses the sludge to dewater it. By dewatering the sludge as it moves along a downpath conveyor portion that conveys sludge dropped thereon, applicant avoids having to pump the sludge and thereby avoids cutting up the sludge as a result of such pumping. In addition, by dewatering it along the same conveyor, applicant minimizes the required space and allows the same conveyor to be used to convey and dewater the sludge. A preferred conveyor includes a screw conveyor with an uppath portion that receives the sludge through an open top, and with a downpath screw portion of smaller average diameter and which is substantially completely surrounded to compress the sludge. The dewatering of sludge along the same conveyor also facilitates the removal of the water, especially by returning the water to a flotation tank in which the particles are initially floated to separate them from the liquid. The same motor that drives the conveyor can also drive a pump that pumps the water back through a return conduit.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for separating liquid from particles, said apparatus includes a flotation tank with an upstream end having an inlet that receives a mixture of the liquid and particles, and a device which removes floating particles and drops clumped particles, or sludge, at a drop location lying downstream from said upstream end, said apparatus further including:

a conveyor which extends at an incline to the horizontal and which has a lower end portion that lies substantially under said drop location to receive said sludge, said conveyor having an upper end portion which compresses sludge moving along said conveyor to remove liquid therefrom;

said conveyor includes a conveyor housing having an open top at least along said conveyor lower end portion to receive sludge, said housing forming a liquid separates which receives and carries away liquid from sludge compressed at said conveyor upper end portion, with said liquid receiver lying under said conveyor and extending at said incline and having a lowermost portion with a fluid outlet;

a pump that is driven by said conveyor and that lies at the lower end portion of said conveyor, said pump having a pump inlet connected to said fluid outlet and having a pump outlet, and including a return conduit that connects said pump outlet to said tank upstream end.

2. Apparatus for separating a liquid that is substantially water from particles to obtain clean water and sludge, wherein said apparatus includes a flotation tank with an upstream end into which a mixture of the water and particles is directed, and a downstream end portion, said apparatus further including a first device at said downstream end portion which removes floating particles from an upper portion of said tank and drops clumped particles, or sludge, at a drop location, and a second device that carries away clean water from a lower portion of said tank downstream end portion, the apparatus further including:

a conveyor which extends at an incline to the horizontal, with a lower end portion that lies substantially under said drop location to receive said sludge, said conveyor having a higher second end portion which compresses sludge moving along said conveyor to remove water therefrom;

said conveyor including a liquid receiver which separates sludge-entraining water from sludge compressed at said higher second end portion of said conveyor;

said apparatus includes a return conduit extending from said receiver to said tank upstream end, for carrying former sludge-entraining water from said receiver to said tank upstream end portion.

3. A method for receiving a mixture and separating liquid from particles in the mixture, which includes flowing said mixture into an upstream portion of a tank, floating particles in the liquid in the tank, moving floating particles and some liquid, or sludge, and dropping the sludge at a drop location that lies at a downstream portion of the tank, and removing clean liquid from said downstream portion of said tank, said method further comprising:

catching sludge which is dropped at said drop location, in a lower portion of an inclined trough that has a closed bottom to prevent the escape of liquid and sludge, advancing said sludge along an upwardly-inclined sludge path that extends at an upward incline partially along said trough while separating former sludge-entrained liquid therefrom, compressing said sludge along an upper portion of said sludge path, carrying former sludge-entraining liquid along a downward incline from said upper portion of said sludge path in a direction opposite to said sludge path, removing said former sludge-entraining liquid from the lower portion of said trough, and flowing substantially all of said former sludge-entraining liquid directly back to said upstream portion of said tank substantially without first storing it.

4. Apparatus for separating liquid from particles, wherein said apparatus includes a floatation tank with a beach that ends in a cliff and a device which pushes particles along said beach to fall over said cliff, the apparatus further including:

a screw conveyor that includes an elongated shaft, a motor that turns said shaft about an axis, a screw connected to said shaft to be turned by said shaft, and a conveyor housing which closely surrounds at least portions of said screw, said screw conveyor extending at an incline to the horizontal with a first end portion being lowermost and an opposite second end portion lying at a higher level than said first end portion;

said screw having an inclined lowermost first screw end portion and having a higher second screw portion, with both of said screw end portions being mounted on said shaft;

said conveyor housing having an inclined lowermost first housing end portion which lies partially around said inclined lowermost first screw end portion, and said housing having a higher second screw end portion which substantially completely surrounds said screw second portion;

said lowermost first housing end portion having a closed bottom side and an open-topped upper side, as seen in a view taken along said axis, with said upper side being open and lying under said cliff to catch said particles and confine said particles as said screw advances said particles along said upwardly inclined open-topped first housing end portion, and means in said housing for separating said liquid from said particles and for isolating said liquid from said particles in said closed bottom side of said first housing portion;

a conduit which carries liquid from said closed bottom side of said first housing end portion back to said floatation tank.

\* \* \* \* \*